Nov. 22, 1955

J. HETZLER 2,724,327

APPARATUS FOR EXPRESSING OIL FROM OIL
CONTAINING VEGETABLE MATERIALS

Filed Feb. 26, 1951

Inventor

Johannes Jozef Hendricus Maria HETZLER

By *Heinrich Hochwald*

Attorney

Nov. 22, 1955 — J. HETZLER — 2,724,327
APPARATUS FOR EXPRESSING OIL FROM OIL CONTAINING VEGETABLE MATERIALS

Filed Feb. 26, 1951 — 6 Sheets-Sheet 2

Inventor
Johannes Jozef Hendricus Maria HETZLER
By
Attorney

Nov. 22, 1955

J. HETZLER 2,724,327

APPARATUS FOR EXPRESSING OIL FROM OIL
CONTAINING VEGETABLE MATERIALS

Filed Feb. 26, 1951

Inventor

Johannes Jozef Hendricus Maria HETZLER

By

Attorney

Nov. 22, 1955 — J. HETZLER — 2,724,327
APPARATUS FOR EXPRESSING OIL FROM OIL CONTAINING VEGETABLE MATERIALS
Filed Feb. 26, 1951 — 6 Sheets-Sheet 4

Inventor
Johannes Jozef Hendricus Maria HETZLER
By *Heinrich Rothschild* Attorney Inventor
Johannes Jozef Hendricus Maria HETZLER
By Heinrich Hochschild
Attorney

2,724,327
APPARATUS FOR EXPRESSING OIL FROM OIL CONTAINING VEGETABLE MATERIALS

Johannes Hetzler, Semarang, Indonesia

Application February 26, 1951, Serial No. 212,792

Claims priority, application Netherlands February 28, 1950

3 Claims. (Cl. 100—121)

The invention relates to an apparatus for expressing oil from oil bearing, more or less disintegrated, vegetable material, particularly copra, and it is an object of the invention to reduce the frictional resistance of such apparatus which otherwise, in addition to high energy consumption might cause heavy wear of the machinery.

More particularly, the invention is concerned with that type of apparatus, in which the oil bearing, vegetable material, more or less disintegrated, is fed to and between a pair of co-operating rollers disposed close to each other with a narrow gap therebetween for expressing the oil from the material.

An object of the invention is thus an apparatus by means of which the expressed oil may be separated readily and securely from the oil bearing material without the risk that the material arriving at the zone of close proximity of the rollers, under the back pressure of the co-operating rollers, is washed away by the oil flowing back from the material which previously has arrived between the rollers.

These and other objects of the invention are accomplished when, in accordance with the invention, the oil bearing, more or less disintegrated, vegetable material is fed to and between the pair of co-operating rollers under pressure gradually increasing and approaching, but not reaching, the oil expressing level so that no considerable amount of oil will be expressed from the material before the oil expressing zone between the rollers is reached. Thereon, before this zone of high pressure between the rollers is reached, the pressure on the oil bearing material is relieved and thereby a zone of reduced pressure created, interposed between two zones of higher pressure, into which zone of reduced or relieved pressure, the oil expressed from the material by the rollers may flow back and from which the oil may then freely escape to the outside.

The apparatus for expressing the oil from the more or less disintegrated, oil bearing, vegetable material, includes a pair of non-perforated rollers with fluted, grooved, or otherwise roughened, thus not smooth but uneven surfaces, arranged close to each other for co-operation and for expressing the oil from the material, and in addition thereto, a specifically developed arcuate guide plate for feeding the material to and between the rollers.

This arcuate guide plate with a smooth concave side is disposed opposite and close to the working surface section of one, the upper, of the rollers, at the side where the direction of rotation leads to the bite of the rollers, and reaches into the zone where the rollers are close to each other. The arcuate guide plate is so disposed and shaped so as to constitute with the working surface section of the appertaining roller an arcuate narrow first passage section tapering in the direction towards the bite of the rollers with the narrowest end of this passage section located well in front of the bite of the rollers. Along this tapering passage the oil bearing material is fed with gradually increasing pressure which at this narrowest end is sufficiently high to prevent the oil expressed by the bite of the rollers from penetrating backwards into this first passage section from the zone between this first passage section and the bite of the rollers.

The guide plate is further shaped so as to constitute with the working surface section of the roller a passage section with a widening passage area following the narrowest end of the preceding tapering passage section, the widening passage section extending towards the bite of the roller.

On the path along the wider passage section, the pressure on the material decreases and a zone is thus provided where the pressure on the material is so low as to allow the expressed oil to penetrate into the material within this section of wider passage area. The guide plate at the widening passage section is provided with the oil outlets for discharging the penetrated oil which under the back pressure of the bite of the rollers has been pressed backwards into the wider passage section against the direction along which the material is fed.

The oil bearing material thus is gripped by a considerable portion of the roughened roller surface and is fed along the smooth guide plate, the air present in the material being expelled in the decreasing, wedge-shaped, narrowing passage between the guide plate and the portion of the roller surface opposite and close thereto. This passage or path along which the material is to be fed, is closed at both sides by flanges secured to the sides of the upper roller. The propelling force exerted by the roller surface ensures that the oil bearing material is uniformly fed to and between the rollers and that, practically, also owing to the absence of air, immediately after the material has been gripped by and between both rollers, the expelling of the oil starts while the material is prevented from gliding and escaping.

Through the arrangement of the guide plate which constitutes with the roller surface a narrow, arcuate feed passage, the section of widening passage area or of decreased pressure is thus enclosed between two narrower sections of higher pressure on the material, the one, a preceding section of a pressure near to but not reaching the oil expressing level, the other, a succeeding section, i. e. the bite of the rollers, of a pressure of the oil expressing level.

To the rear of the zone of decreased pressure, the material is under increased pressure sufficient to prevent the expelled oil from washing away the material which is being fed towards the expressing zone. Since the zone of increased passage area or of decreased pressure is thus interposed between a zone of narrower cross section to the rear and one in front, that of the bite of the rollers, the expressed oil may readily pass into this zone of decreased pressure in a direction opposite to that along which the material is fed. The expressed oil may then readily be discharged at that place through oil outlets provided in the lower part of the guide plate. The oil, therefore, is separated at low pressure from the material and the formation of foots, so much dreaded, is thus precluded.

The oil separator provided at this section of the feed path of reduced pressure, underneath the oil outlets in the guide plate, comprises a perforated body and a wedge-shaped element, the apex of which extends and reaches into the zone where the surfaces of the rollers approach each other closely. In this zone, the upper surface of this element forms a continuation of the guide plate whilst the lower surface of the wedge-shaped element lies close to the surface of the lower roller. The oil separator body is perforated with oil passages, of a total cross sectional passage-way larger than that of the oil outlets in the guide plate, so that the total cross section of the oil passages increases from those in the guide plate to those in the oil separator body, thus in the discharge direction.

An embodiment of the apparatus of the invention will now be described, by way of example, and illustrated in and by the accompanying drawings in which.

Figure 8:
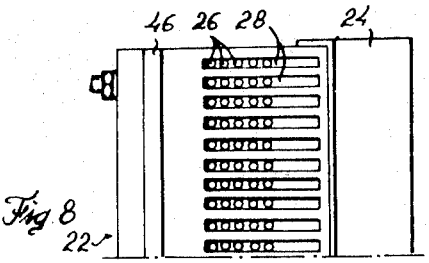
Figure 9:
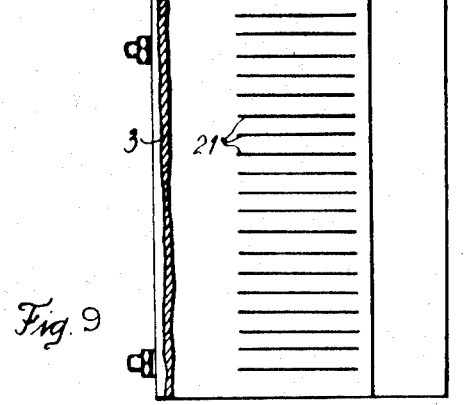
Figure 10:
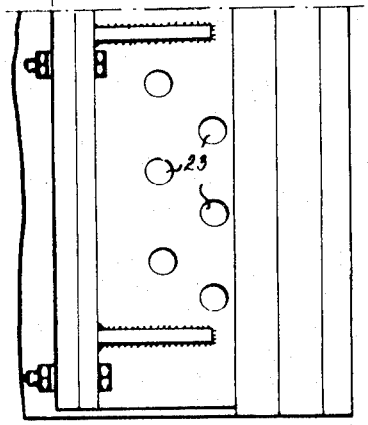

Figs. 8 and 9 respectively are top views of the oil separator and of the end part of the guide plate which covers the same;

Fig. 10 is a view of the oil separator from below; and

Figure 11:
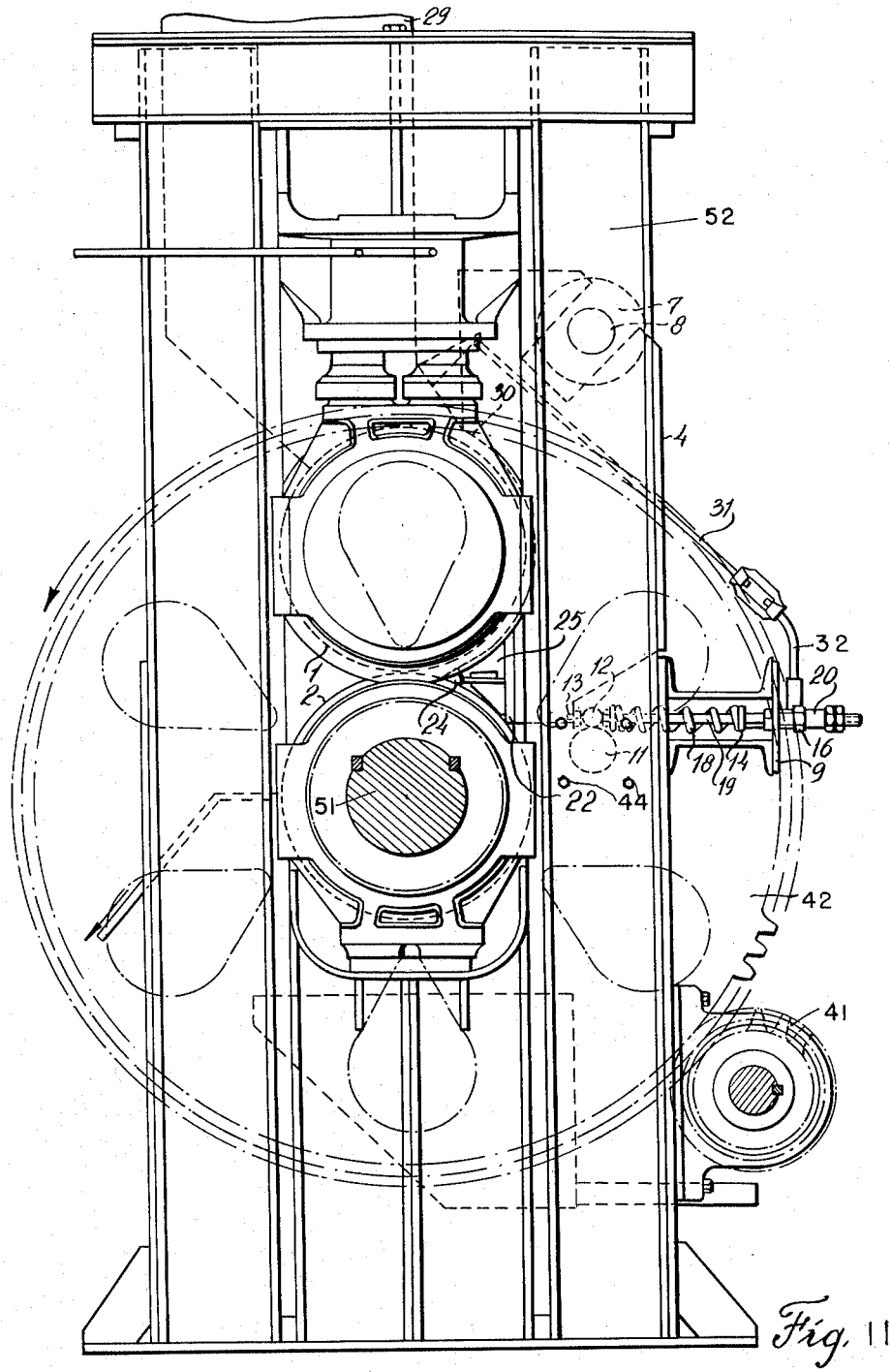

Fig. 11 is a side elevational view of the apparatus.

Figure 1:
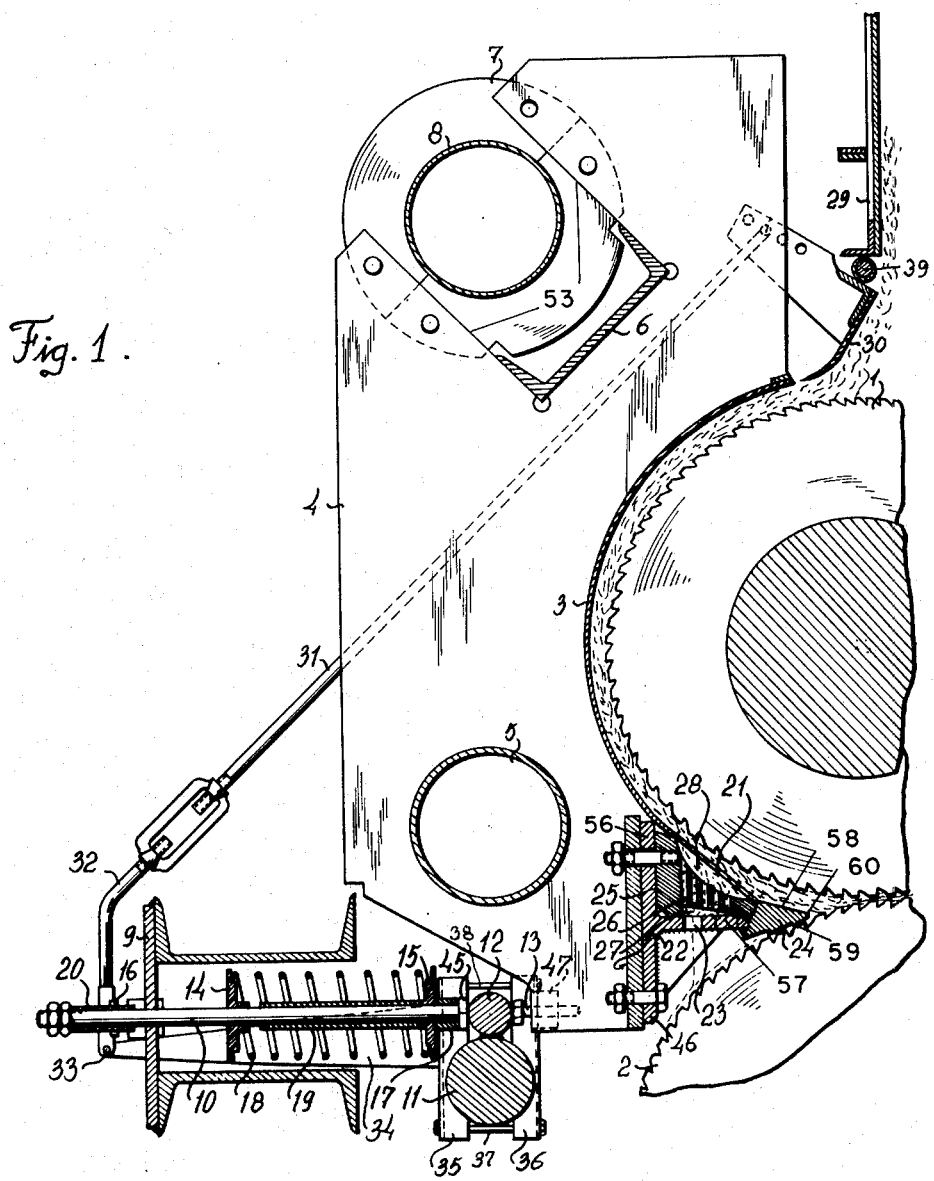
Fig. 1 is an elevational section of the apparatus, partly in section, only part of the rollers and of the feeding container being shown.
Figure 2:
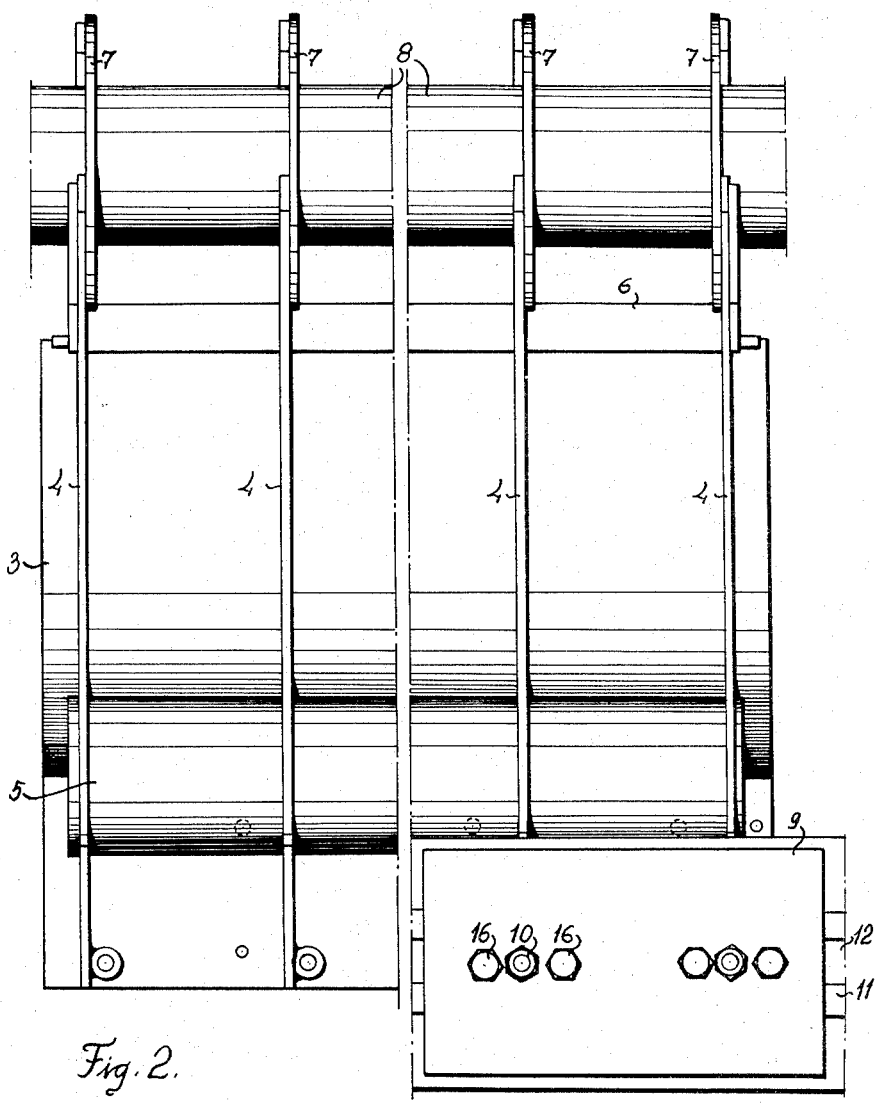
Fig. 2 is a side elevational view thereof.

The apparatus illustrated comprises a pair of rollers 1, 2 with non-perforated, axially fluted or grooved peripheral surfaces (Fig. 1). The rollers are driven by any convenient or conventional drive, not shown here, by means of which a pinion 41 is driven which in turn drives a gear wheel 42 keyed on the shaft 51 of roller 2, Fig. 11. Roller 2 drives roller 1 through surface friction of the material passed between the rollers. Facing the upper roller 1 and in spaced relation thereto, is an arcuate, highly polished guide plate 3 carried by a series of plate-like webs 4 suspended from a tube 8 secured to the framework 52 of the apparatus. At their lower ends, the webs 4 are secured to and held in proper spaced relationship by a tubular support 5 and adjacent to their upper ends by a channel iron 6 passed through and secured within conformably shaped cut-outs 53 of plates 4.

Against one side of each of said plates 4 and covering the cut-out therein, there is secured a two-part annular disc 7 by means of which the entire structure is pivotally suspended from tube 8. This tube 8 is extended over the whole width of the apparatus and, properly secured to the frame work of the apparatus, serves as a stay of the rolling mill frame 52, see Fig. 11. The guide plate may thus be swung about tube 8 as a pivot and may be adjusted relatively to the roller 1 in such a manner that the passage, defined by the guide plate and the roller surface gradually decreases or tapers in its cross-sectional area, in the direction towards the bite of the rollers, until it reaches a narrowest end, indicated in Fig. 6 at 54, well in front of the rollers.

Following the narrowest end, 54, of the tapering passage section, the guide plate is further shaped so as to constitute with the working surface section of the roller appertaining thereto a widening passage section, as indicated extending to about 55, to be followed by a passage section which still remains wider than the narrowest end of the tapering section, until the direct vicinity of the bite of the rollers is reached.

At the widening passage section guide plate 3 is provided with narrow oil outlet slits 21.

The material compacted in the tapering section between guide plate 3 and roller 1 is readily gripped between the rollers 1 and 2. The pressure between the rollers will be very high and oil will be expressed. This oil may now flow back into the widened space penetrating into the material enclosed in this space, since the pressure in this space owing to its increased cross-sectional area is reduced. The oil will then escape through the slits 21.

The material compressed at the narrowest end, 54, of the tapering passage section, owing to the high pressure there obtaining, will prevent further backward flow of the oil as well as backfeed of the material.

Figure 3:
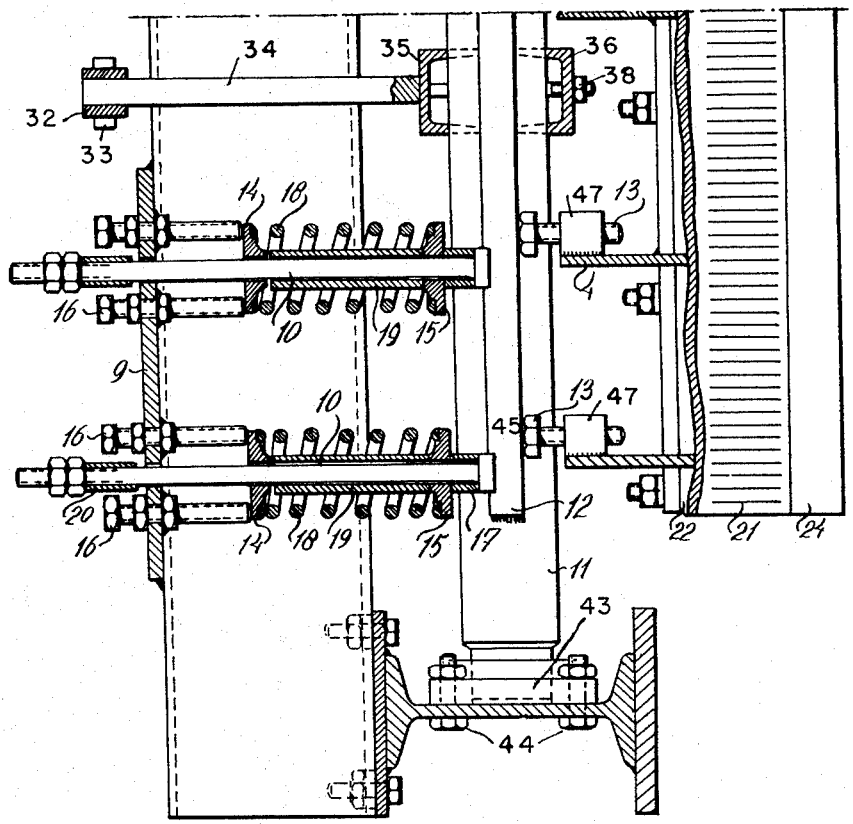
Fig. 3 is a top view of the stabilizer mechanism of the guide plate.
Figure 4:
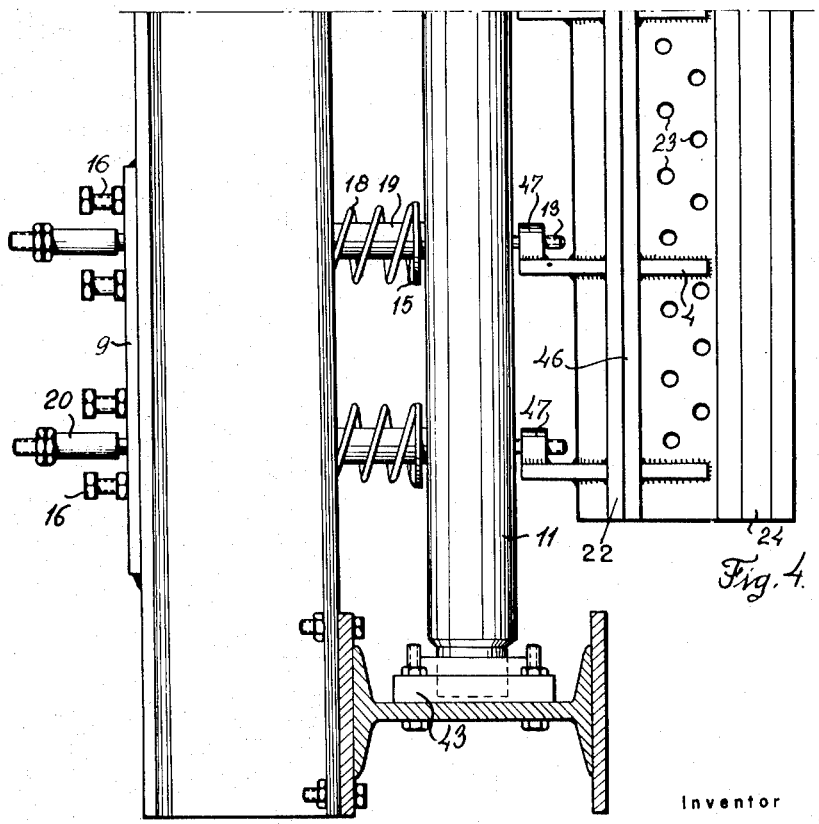
Fig. 4 is a view from below on the same mechanism.

The adjustment of the plate is obtained, within certain limits, by springs with adjustable pressure. To this end, as Figs. 3 and 1 illustrate, push rods 10 are provided slidably mounted in a stationary frame 9. The rods 10 act upon screws 13, attached to the lower ends of the plates 4, through the intermediary of a common stabilizer 11, 12 extended parallel to the axes of the rollers, member 11 of the stabilizer being pivotally mounted at both its ends in bearing sockets 43 secured at 44 to the frame work of the apparatus, as illustrated in Figs. 3, 4, and 10 for the one end of member 11.

Each rod 10 carries slidable thereon two discs 14, 15 of which one disc 14 bears against a pair of set screws 16, Fig. 3 and thus is held at a distance from the stationary frame 9 and the other disc 15 bears through a sleeve 17 against the head 45 of rod 10. Between the discs 14, 15, there is provided a pre-tensioned pressure spring 18 which thus urges head 45 against the stabilizer bar 12, as Figs. 3 and 1 illustrate. An abutment sleeve 19 loosely surrounds the rod 10, and in cooperation with the fixed disc 14, limits the rearward movement of guide plate 3 and its accessories. The forward movement of the guide plate, under the influence of the springs 18, is limited by short sleeves 20 which are mounted with clearance on the rods 10 and are adapted to bear against the stationary frame 9.

An oil separator is provided underneath the slits 21, comprising a body 25 perforated with oil passages 26. Body 25 is seated on a beam in form of a T-bar 46 and is secured with the upper flange 56 of the T-bar at the plate 22 which, on its part, is secured to the webs 4, see Figs. 3 to 5.

Figure 6:
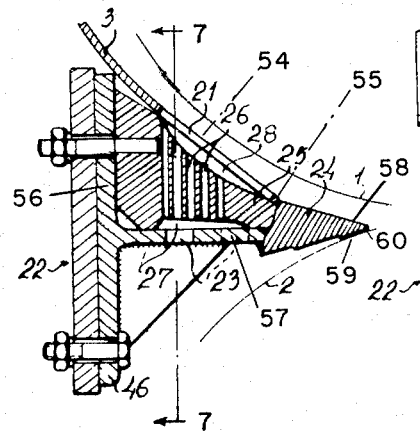
Figs. 6 and 7 are, on an enlarged scale, respectively an elevational section and a transversal section, along line 7—7 of Fig. 6, of the oil separator.
Figure 7:
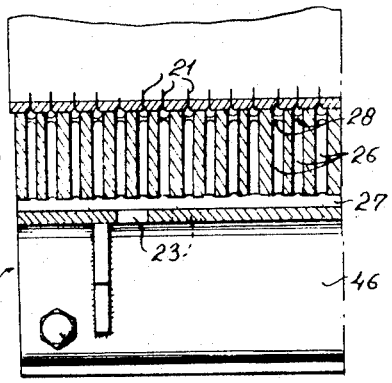

Within the upper surface of body 25 into which the slits 21 open, there are shaped concave recesses 28, Figs. 1, 6 and 8.

The web 57 of T-bar 46 is perforated by apertures 23, Figs. 1, 4 and 10, through which the oil will finally escape. The three groups of passages 21, 26, and 23, are so dimensioned that the total cross section of each group increases from group to group in the direction along which the expressed oil escapes.

Web 57 terminates in a bar 24 of wedge-shape. This bar is disposed so as to form with its upper face 58 a continuation of the guide plate whereas its lower face 59 lies near the working section of the lower roller 2, while the apex 60 of the wedge-shaped bar extends into the zone where the rollers approach each other.

Above roller 1, there is arranged a heating vessel 29, indicated in Figs. 1 and 10, but not shown in detail, into which the disintegrated material is dumped and the bottom of which is, to a great extent, formed by the circumferential portion of the surface of roller 1 which passes during the operation of the apparatus underneath the heating vessel. The material thus is supported on roller 1 and, during the rotation of the rollers, is withdrawn from the vessel or container 29 and fed into the space between roller 1 and guide plate 3. The material, fed under its own weight from container 29, is therefore subjected to light pressure, uniform feed thus being ensured.

Figure 5:
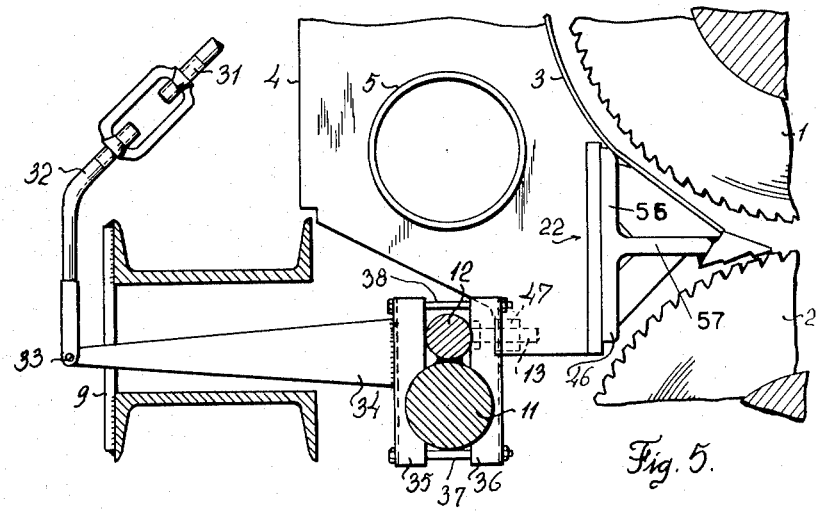
Fig. 5 is an elevational view, partly in section, of the lower part of the steering mechanism of the control flap which regulates the admittance of the material to the apparatus.

The discharge of the material from the heating container 29 is controlled by a flap 30 operated by the stabilizer 12 through a rod system 31, 32, which as Figs. 5, 3 and 1 illustrate are pivoted at 33 to a lever 34 secured to a pair of clamp jaws 35, 36, clamped by means of screws 37, 38 to member 11 of the stabilizer 11, 12 so that the steering mechanism of the control flap 30 follows any pivotal movement of the stabilizer 11, 12.

Should for instance under the influence of too high a pressure of the material or of an obstacle the guide plate 3 be deflected away from the roller or be tilted clockwise, Fig. 1, about its pivot 8 and against the tension of the springs 18, screws 13, threadably mounted in nuts 47 secured to the plates 4, would push the stabilizer bar 12 and tilt it and with it member 11 counter-clockwise and correspondingly lever 34. The rod system 31, 32 is pulled downwards and will thus tilt flap 30 counterclockwise about its pivot 39 and thus retard the flow of the material. As soon as the obstacle disappears, the guide plate 3 will tilt back towards the roller, counter-clockwise, and the mechanism 34, 33, 32, 31 will swing the flap clockwise about pivot 39 and thus increase the mass flow of the material. Steady operation of the apparatus is thus ensured and adjustment of the output of the apparatus readily made possible.

The operation of the apparatus is as follows:

The material within the arcuate wedge-shaped space between roller 1 and the polished guide plate 3 is forced by the plate against the grooved surface of the upper roller 1 and through friction is taken along by this surface and thus fed towards the zone where the two rollers are close to each other, the pressure on the material gradually increasing during this travel.

The oil expressed from the oil bearing material by the rollers flows back and penetrates the material at the edge of the oil separator lying towards the zone of close proximity of the rollers. The oil is then discharged through the outlets 21 in the guide plate and through the passages 26 of the oil separator body 25 and the passages 23 in the web of the T-piece 22. Underneath the narrow slits 21, the oil passage immediately widens so that there is no danger that these outlets be clogged. The expressing of oil from oil bearing, vegetable material by means of co-operating rollers, with all the advantages set forth hereinabove, is thus rendered possible through the apparatus of the invention.

What I claim is:

1. An apparatus for expressing oil from oil bearing vegetable material, including in combination with a pair of driven pressing rollers having uneven non-perforated working surfaces and being disposed close to each other for cooperation in expressing oil from said material, an arcuate guide plate having a smooth concave side and being disposed opposite and close to the working surface section of one of said rollers, at the side where the direction of rotation of said roller leads to the bite of the rollers, said guide plate being shaped so as to constitute with said working surface section a narrow arcuate passage section tapering in the direction towards the bite of the rollers, the narrowest end of said tapering passage section being located well in front of the bite of the rollers, the cross-sectional area of the passage at said narrowest end being small so as in operation of the apparatus to produce a high pressure in the material; said guide plate, following said narrowest end of the tapering passage section, being further shaped so as to constitute with said working surface section a widening passage section having a cross-sectional area widening from said narrowest end and extending towards said bite of the rollers; thereby to provide, at the operation of the apparatus, between the bite of the rollers and said narrowest end of the tapering passage section a zone of decreased pressure, the pressure being so low as to allow the expressed oil to penetrate backwards from said bite of the rollers into the material in said widening passage section, the high pressure at said narrowest end preventing the oil from penetrating further backwards into said tapering passage section; said guide plate at said widening passage section being provided with oil outlets for discharging the penetrated oil.

2. An apparatus as set forth in claim 1 wherein underneath said widening passage section and underneath said oil outlets in the guide plate there is provided an oil separator comprising a body having oil passages formed therethrough disposed relatively to said oil outlets in the guide plate so as to communicate therewith, the total cross-sectional area of said oil passages surpassing that of the oil outlets; said oil separator further comprising a beam for supporting said body, said beam being provided with oil passages therethrough disposed relatively to the passages in said body so as to communicate therewith; said beam being further provided with a wedge-shaped element terminating an edge of the beam, said wedge-shaped element being disposed so as to form with the upper one of its faces a continuation of said guide plate, the lower face of said wedge-shaped element being adjacent to the working surface section of the other one of said rollers, said wedge-shaped element having its apex extended into the zone where the surfaces of the rollers approach each other.

3. An apparatus as set forth in claim 1 wherein underneath said oil outlets there is provided an oil separator comprising a body having oil passages formed therethrough disposed relatively to said oil outlets in the guide plate so as to communicate therewith, said oil separator further comprising a beam for supporting said body, said beam being further provided with oil passages therethrough disposed relatively to the passages in said body so as to communicate therewith, said beam further having a wedge-shaped element having its apex extended into the zone where the surfaces of the rollers approach each other; said apparatus further including a pivot secured to the framework of the apparatus, upright spaced webs pivotally suspended from said pivot, said guide plate and oil separator being secured to said webs, and adjusting means associated with said webs for adjusting thereby the position of said guide plate and said oil separator relatively to the roller cooperating with said guide plate.

References Cited in the file of this patent

UNITED STATES PATENTS

| Number | Name | Date |
| --- | --- | --- |
| 91,210 | Carter | June 15, 1869 |
| 285,166 | Sanford | Sept. 18, 1883 |
| 577,394 | Young | Feb. 16, 1897 |
| 711,938 | Casper | Oct. 28, 1902 |
| 1,509,730 | Hughes | Sept. 23, 1924 |
| 1,700,571 | Milne | Jan. 29, 1929 |
| 1,823,955 | Sargent et al. | Sept. 22, 1931 |
| 2,069,448 | Ireland et al. | Feb. 2, 1937 |
| 2,567,045 | Amery | Sept. 4, 1951 |